(12) United States Patent
Lewis

(10) Patent No.: US 8,453,811 B2
(45) Date of Patent: Jun. 4, 2013

(54) SPHERICAL BRAKING SYSTEM

(75) Inventor: Aaron J. Lewis, Waterford, PA (US)

(73) Assignee: Lewis Designs, LLC, Waterford, PA (US)

(*) Notice: Subject to any disclaimer, the term of this patent is extended or adjusted under 35 U.S.C. 154(b) by 175 days.

(21) Appl. No.: 12/961,746

(22) Filed: Dec. 7, 2010

(65) Prior Publication Data

US 2011/0132701 A1 Jun. 9, 2011

Related U.S. Application Data

(60) Provisional application No. 61/267,508, filed on Dec. 8, 2009.

(51) Int. Cl.
*F16D 51/00* (2006.01)

(52) U.S. Cl.
USPC ............. 188/325; 188/78; 188/79; 188/67; 188/75; 188/382

(58) Field of Classification Search
USPC ........... 188/78, 79, 67, 75, 325, 382; 180/7.1, 180/20
See application file for complete search history.

(56) References Cited

U.S. PATENT DOCUMENTS

| | | | | |
|---|---|---|---|---|
| 2,055,267 A * | 9/1936 | Uffert | ................. | 188/140 R |
| 2,687,546 A * | 8/1954 | Oppenheimer | ............... | 16/26 |
| 2,719,043 A * | 9/1955 | Oppenheimer | ............ | 280/47.11 |
| 3,876,027 A * | 4/1975 | Crise | ......................... | 180/339 |
| 3,951,426 A * | 4/1976 | Shaffer et al. | ............. | 280/47.34 |
| 4,464,127 A * | 8/1984 | Boudreaux | ..................... | 440/74 |
| 4,861,053 A * | 8/1989 | Yeomans, Jr. | ................. | 280/205 |
| 6,802,381 B1 * | 10/2004 | Koors et al. | ................... | 180/7.1 |
| 7,188,845 B1 * | 3/2007 | Cider, III | ................... | 280/47.34 |
| 2008/0017424 A1 * | 1/2008 | Phelan | ........................ | 180/7.1 |

* cited by examiner

*Primary Examiner* — Robert A Siconolfi
*Assistant Examiner* — Mariano Sy
(74) *Attorney, Agent, or Firm* — Robert M. Bauer

(57) ABSTRACT

A spherical braking system mounted on a drive shaft of a vehicle comprising a brake sphere pad positioned just above and below a brake sphere and resting on an at least one segment of a brake housing wherein, the brake housing includes a top segment and bottom segment coupled to mounting dogs by using screws. A hydraulic cap installed on a threaded portion of a hydraulic shaft which is encircled by bushing and coupled near a brake sphere. A plurality of hydraulic lines connected from at least one hydraulic splitter are coupled to the hydraulic cap. When the driver depresses the brake pedal, pistons are forced into fluid chambers in the master cylinder. The resulting hydraulic pressure is transmitted through the hydraulic splitter and hydraulic lines to hydraulic caps which results the vertical movement of the brake pads causes a braking torque to be generated, slowing the rotation of the drive shaft and driven shaft simultaneously, which therefore decreases the speed of the vehicle.

16 Claims, 8 Drawing Sheets

SPHERICAL BRAKING SYSTEM

CROSS-REFERENCE TO RELATED APPLICATIONS

The present application claims the benefit of U.S. Provisional Application No. 61/267,508 filed on Dec. 8, 2009, which is incorporated herein by reference.

FEDERALLY SPONSORED RESEARCH

Not Applicable

BRIEF DESCRIPTION OF THE DRAWINGS

These and other features, aspects and advantages of the present invention will become better understood with regard to the following description, appended claims, and accompanying drawings where:

DESCRIPTION

Field of the Invention

Figure 1:
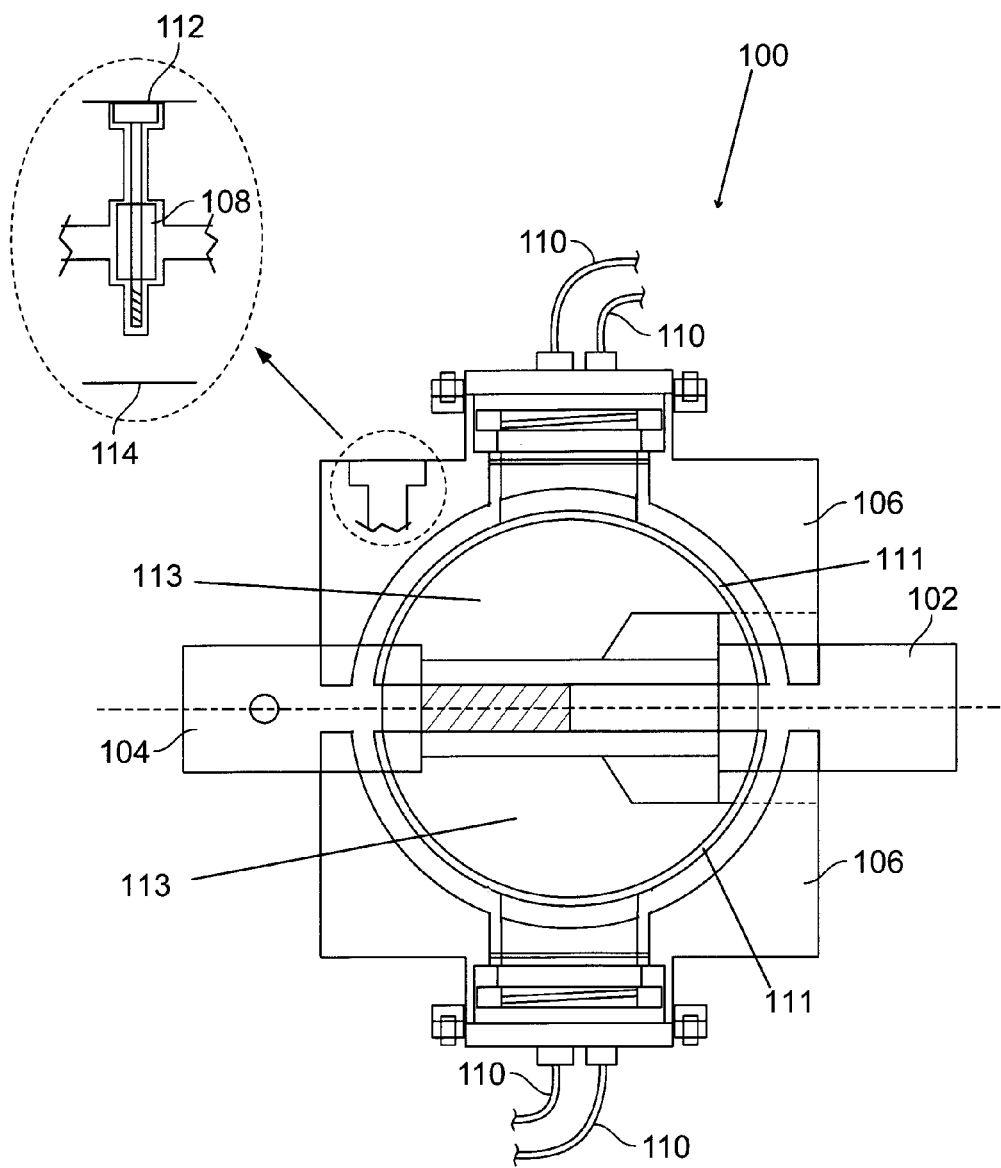
FIG. 1 is a diagram depicting a side view cross section of a braking system.

The present invention relates to a vehicle braking system. More particularly, the present invention relates to a spherical braking system of a vehicle mounted on a drive shaft.

Description of Related Art

Typically a vehicle's braking system is comprised of a brake device having different components, which are used for slowing down or stopping said vehicle. More precisely, these devices decrease or stop the speed of a moving or rotating body by absorbing kinetic energy mechanically or electrically. They are widely used in motor vehicles, buses, trucks, trains, airplanes, tractors and other types of vehicles.

Conventional hydraulic braking systems of a vehicle work on the principle of Pascal's law. Pascal's law states that "pressure exerted anywhere in a combined incompressible fluid is transmitted equally in all directions throughout the fluid, such that the pressure ratio remains the same."

Typical hydraulic braking systems contain a fluid storage tank, brake cylinders, a set of fluid lines and the like. When the driver depresses the brake pedal, the fluid from the storage tank is transferred through hydraulic lines to the brake cylinder. The brake cylinder then causes a brake pad to come into contact with the rotor attached to a vehicle's wheel, thereby slowing the vehicle's speed. The effective communication between the fuel storage tank to brake cylinder plays a vital role in efficient working of braking system of a vehicle.

The effective communication between the brake cylinders and the fluid storage tank is controlled conventionally by a direction control valve. The safety system of a vehicle, for example in an anti-lock braking system and anti-skid system, depends on the braking system of said vehicle. An efficient braking system is necessary to maintain the proper function of the safety system. The efficient working of the safety system is only possible by providing effective communication between the brake cylinders and the fluid storage tank.

Conventional braking systems of a vehicle include multiple mating parts, for example: brake drum or pad, rotor, hydraulic cylinders and the like located on the outer side of a wheel. It is not insignificant that the process of assembling and disassembling the mating parts be convenient to the vehicle mechanic during brake system servicing. Conventional braking systems are located at the exterior aspect of the wheel, which exposes the braking system to the elements and leaves the system susceptible to damage when servicing the tire or when there is a minor damage from an accident.

Hence there is a need for a vehicle braking system mounted on the actual drive shaft with an in-line hydraulic fluid splitter for providing effective communication between fluid storage tank and the brake cylinder. In addition, such a vehicle braking system located on the interior aspect of the vehicle's wheel makes it more stable during routine maintenance as well as during accidents, all while still providing a level of access for the vehicle mechanic.

BRIEF SUMMARY OF THE INVENTION

Exemplary embodiments of the present invention are directed towards a spherical braking system mounted on the drive shaft of a vehicle. The brake system of a vehicle is positioned at the drive shaft. A brake sphere is attached to the drive shaft and driven shaft near a wheel of a vehicle. In the preferred embodiment, four braking systems are utilized for each vehicle to provide maximum stopping power and longer life of the brake pads. Alternatively, one, two or more braking systems, depending on the vehicle's needs, can be used on a single vehicle.

Generally, two hemispherical brake pads are used for each braking system. One pad is mounted above the brake sphere and the other is mounted below. The pads are supported on an at least one segment of a brake housing. According to the exemplary embodiment of the present invention, said brake housing includes a top segment and bottom segment coupled to the mounting dog by using a screw. The mounting dog provides proper spacing between the top and bottom segments of the brake housing. A hydraulic shaft encircled by bushing is connected to the brake pad. The hydraulic bushing is more advantageous in terms of preventing the leakage of fluid from the hydraulic shaft braking chamber. A hydraulic cap is installed on the hydraulic shaft. However, while installing the brake housing, said mounting dogs must be held in place to screw the top brake housing to bottom brake housing. Both housings are then screwed from the driven shaft to the drive shaft.

A series of hydraulic lines projected from the hydraulic splitter are connected to the hydraulic line caps. Further, the hydraulic splitter is connected to the factory hydraulic system. A bleeder valve is positioned at the hydraulic cap for releasing trapped air present in the hydraulic lines. When the driver depresses the brake pedal, the fluid from the factory hydraulic system is transferred through the hydraulic lines to the hydraulic caps which results in the vertical movement of the brake pads causing a braking torque to be generated. This braking torque is applied to the brake sphere and hence the drive shaft which thereby slows the rotation of the drive shaft and driven shaft simultaneously and accordingly decreases the speed of the vehicle.

DETAILED DESCRIPTION OF THE INVENTION

A spherical braking system mounted on a drive shaft of a vehicle includes a brake sphere pad positioned above and below a brake sphere and resting on at least one segment of a brake housing wherein, the brake housing includes a top segment and bottom segment coupled to mounting dogs by using a screw. A hydraulic cap installed on a threaded portion of a hydraulic shaft which is encircled by bushing and coupled near the brake sphere. A plurality of hydraulic lines connected from at least one hydraulic splitter is coupled to the hydraulic cap. When the driver depresses the brake pedal, pistons are forced into fluid chambers in the master cylinder. The resulting hydraulic pressure is transmitted through the hydraulic splitter and hydraulic lines to hydraulic caps into the hydraulic fluid chamber, increasing pressure, which results in the vertical movement of the brake pads causing a braking torque to be generated, slowing the rotation of the drive shaft and driven shaft simultaneously. The slowed rotation of the drive shaft and driven shaft accordingly slows the speed of the vehicle.

According to the first aspect of the present invention, the side dissection profile describes the assembly details of the multiple mating parts. The side dissection profile of the spherical braking system depicting drive shaft is coupled to a gear box and driven shaft is coupled to a wheel. The power from the drive shaft is transmitted to the driven shaft, causing the rotation of wheels. A brake sphere is attached to the drive shaft and driven shaft and rotates with the same. The top brake housing and bottom brake housing are screwed together on the mounting dogs.

According to a second aspect of the present invention, the front dissection profile describes the complete details of the mating parts. Multiple segments of the brake housings are coupled together by holding the mounting dogs in place and screws are tightened through the mounting dogs into the brake housings. Brake sphere pad is placed over the brake sphere and rests on the brake housing and is attached to the hydraulic shaft. Hydraulic shaft is encircled by a seal that prevents hydraulic fluid from entering the brake chamber. Multiple hydraulic lines are used to transfer hydraulic pressure from the factory hydraulic system to brake sphere pads.

According to a third aspect of the present invention, an in-line hydraulic fluid splitter, 1 per sphere braking system and 4 per vehicle are used to split the hydraulic fluid pressure into multiple hydraulic lines. A universal screw clamp is used to mount the hydraulic splitter. A male screw clamp is led through channels on the hydraulic line splitter through the top to the bottom as the female end is let around the draft shaft and met up with the male end below the drive shaft, secured by a bolt.

According to a fourth aspect of the present invention, a hydraulic brake pump distributes the hydraulic fluid pressure to a spherical brake system located at each of the four wheels of a vehicle. When the driver depresses the brake pedal, the resulting hydraulic pressure is transferred to hydraulic splitter located at one on each of the spherical braking system of a vehicle. The hydraulic splitter splits the hydraulic fluid pressure path and transfers the fluid to the top and bottom housings of the brake system. The spherical braking system is applicable to four wheel drive, all wheel drive and the two wheel drive systems of a vehicle, according to a non-limiting exemplary embodiment of the present invention.

Referring to FIG. 1 is a diagram depicting side view cross section of a braking system 100. The drive shaft 102 is coupled with the driven shaft 104 and the power is transmitted from the drive shaft to the driven shaft. The brake housing assembly 106 includes top brake housing 112 and bottom brake housing 114 mounted on the mounting dog 108. A series of hydraulic lines 110 are used to transfer the hydraulic fluid pressure from the vehicle's factory hydraulic system. Two brakes pads 111 one connected to the top brake housing and the other connected to the bottom brake housing are forced down by hydraulic pressure onto the sphere 113 which is connected to the drive shaft 102 and the driven shaft 104. The pressure on the sphere 113 slows the rotation of the sphere 113, the driven shaft 104, the drive shaft 102 and, accordingly, the speed of the entire vehicle.

Figure 2:
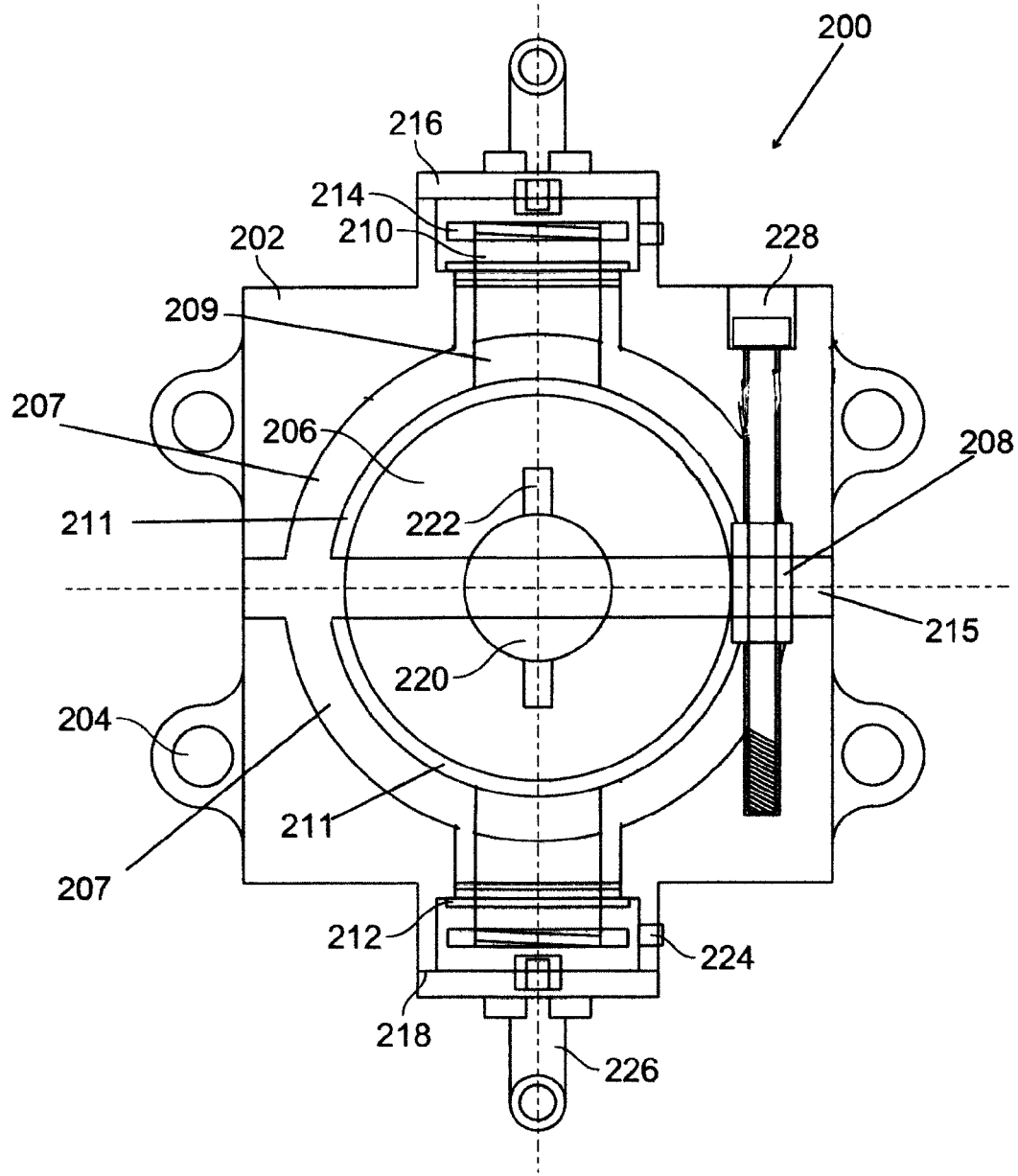
FIG. 2 is a diagram depicting a front view cross section of a braking system.

Referring to FIG. 2 is a diagram depicting a front view cross section of a braking system 200. The brake housing assembly 202 includes top brake housing and bottom brake housing connected by using a set of screws 228 and mounted to the vehicle by using the frame mounts 204. The screws 228 join the top and bottom brake housings with the use of a mounting dog 208 which keep the top and bottom brake housings separated by a space 215. A brake sphere pad 211 is placed over a brake sphere 206. Said brake sphere pad 211 rests on brake housing 202 when not engaged by the hydraulic system. However, FIG. 2 shows said brake sphere pad 211 engaged with said brake sphere 206 as hydraulic pressure is applied to the same. A hydraulic shaft 210 is coupled to the brake sphere pad 211 for generating vertical movement of the brake sphere pad 211. As the brake sphere pad 211 is pushed down to engage with the brake sphere 206, a space 207 is created between said pad 211 and the housing 202. Said space 207 permits cooling of friction heat generated by the engagement of said pad 211 with said sphere 206. The hydraulic shaft 210 is encircled by hydraulic bushing 212, which acts as a seal. The hydraulic bushing 212 is more advantageous in terms of preventing the leakage of fluid from braking chamber. A hydraulic shaft cap 214 threaded to hydraulic shaft 210 and finally hydraulic cap 216 is installed. An o-ring 218 is assembled in between hydraulic shaft cap 214 and hydraulic cap 216. The brake sphere pad 211 is attached to the hydraulic shaft 209 in the hydraulic chamber. The entire spherical brake system is mounted on the drive shaft 220. A key way 222 is located on drive shaft 220. A bleeder valve 224 is positioned at hydraulic cap for releasing trapped air present in the hydraulic lines. A series of hydraulic hose lines 226 are attached to the hydraulic cap 216. Hydraulic lines are used to transfer the hydraulic fluid pressure from the factory hydraulic system. The application of hydraulic fluid pressure will force the brake sphere pad 211 onto the brake sphere 206 and decrease the rotation of the brake sphere 206, the drive shaft 220, therefore the speed of the vehicle.

Figure 3:
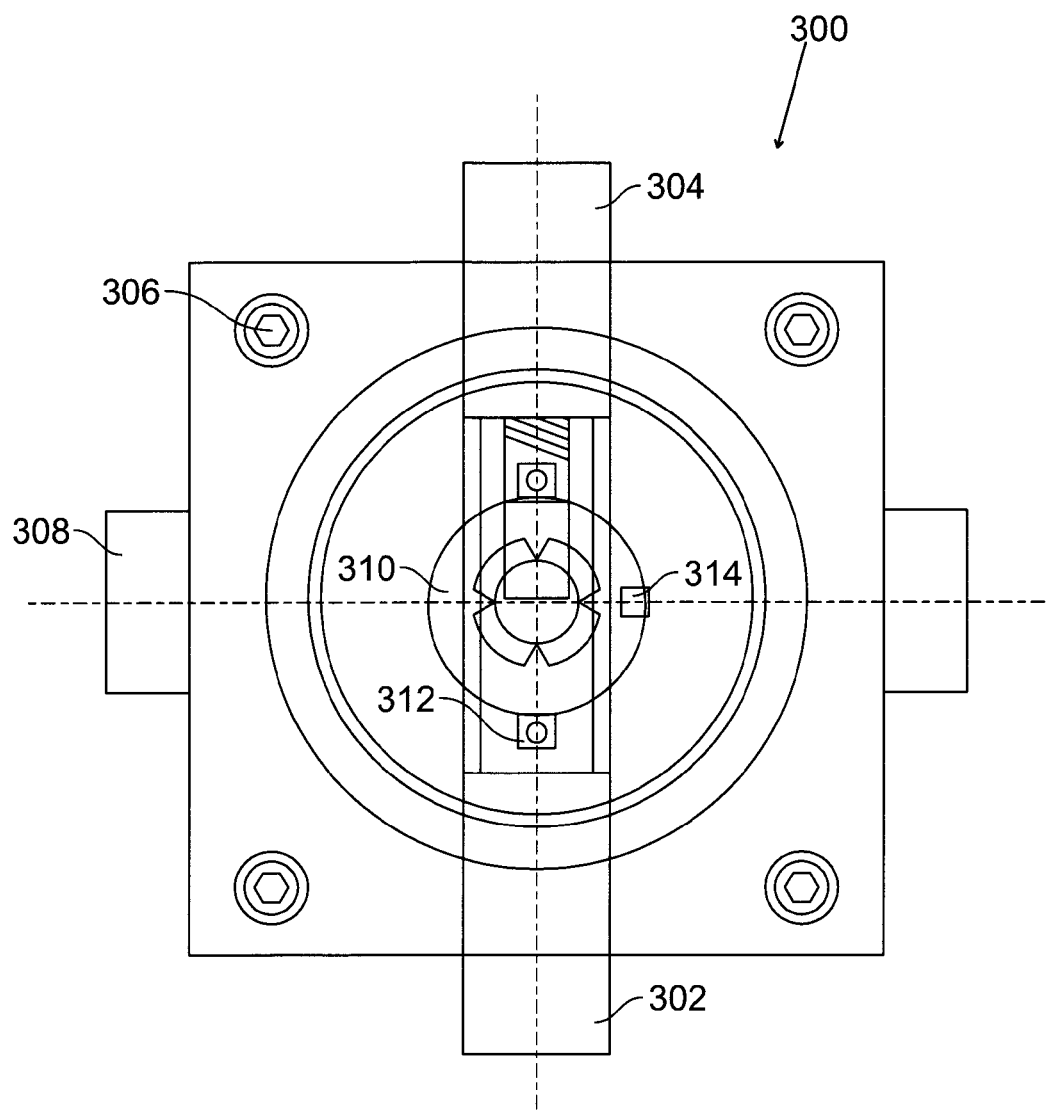
FIG. 3 is a diagram depicting a top view cross section of a braking system.

Referring to FIG. 3 is a diagram depicting a top view cross section of a braking system 300. A drive shaft 302 is coupled with the driven shaft 304 and the power is transmitted from the drive shaft 302 to the driven shaft 304. A multiple brake housing connecting bolts with allen key heads 306 are used to assemble the brake housing. Multiple brake mounts 308 are used to support the spherical brake housing. A multiple brake hydraulic cap screws 312 are used to connect the brake hydraulic cap 310. Bleeder valves 314 are positioned on the outside of the hydraulic chamber on the brake housings for releasing trapped air present in the hydraulic lines.

Figure 4:
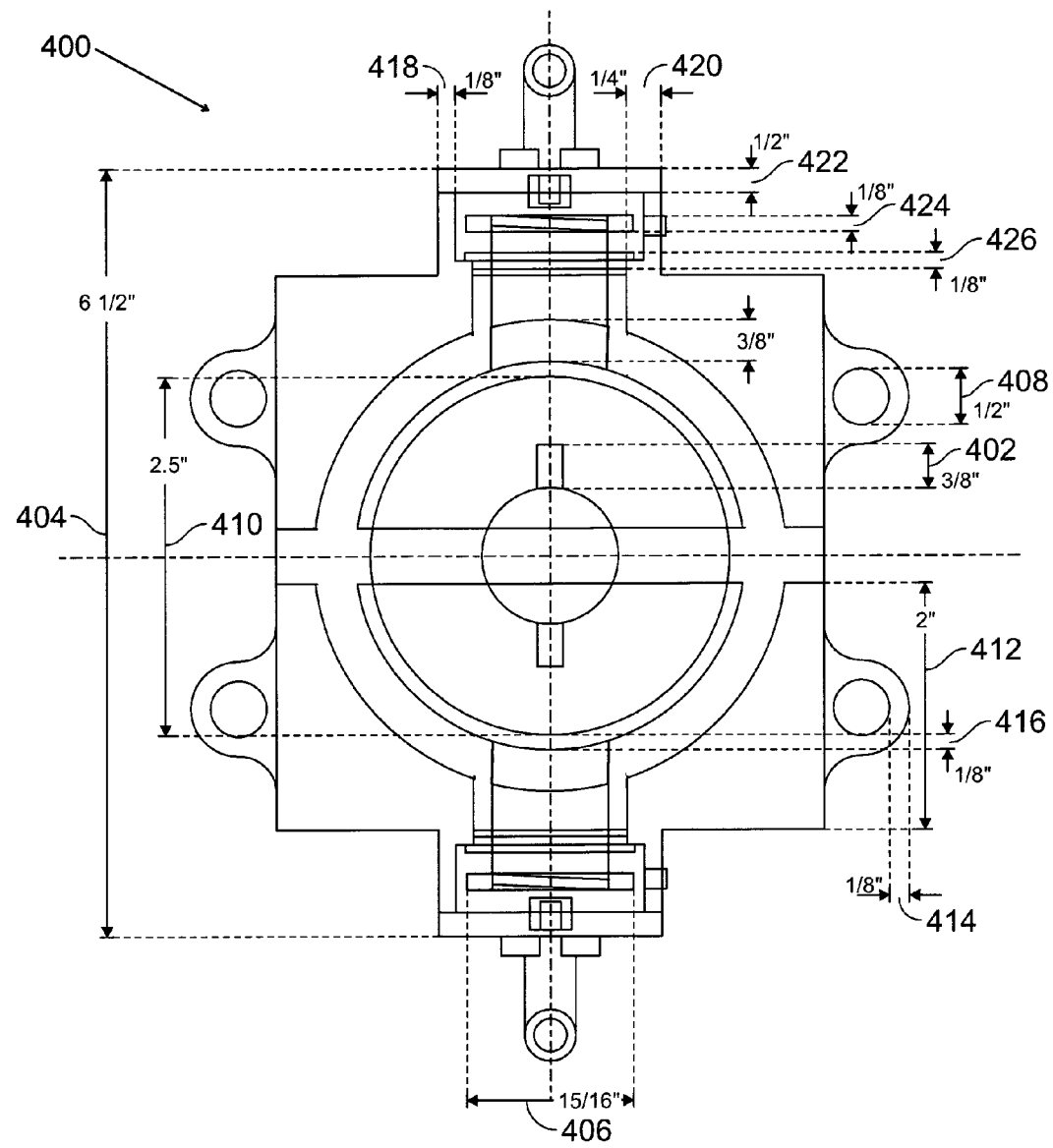
FIG. 4 is a diagram of front view cross section depicting a set of measurements in accordance with an example of the present invention.

Referring to FIG. 4 is a diagram depicting a set of measurements with respect to a front dissection profile 400. According to a non-limiting exemplary embodiment of the present invention the dimension for length of the key 402 is ⅜ inches, the dimension for overall length of the spherical braking assembly 404 is 6 and ½ inches, the dimension for length of hydraulic shaft cap 406 is 15/16 inches, the diameter of the frame mount hole 408 is ½ inches, the diameter of the brake sphere 410 is 2 and ½ inches, the dimension for brake sphere housing 412 is 2 inches, the clearance dimension 414 of the frame mount is ⅛ inches, the wall thickness 416 between brake sphere and brake sphere pad is ⅛ inches, the clearance dimension 418 between hydraulic shaft bushing and brake housing is ⅛ inches, the clearance dimension 420 between hydraulic shaft cap and brake housing is ¼ inches, the thickness of the hydraulic cap 422 is ½ inches, the thickness of the hydraulic shaft cap 424 is ⅛ inches and the thickness of the hydraulic bushing 426 is ⅛ inches, as shown.

Figure 5:
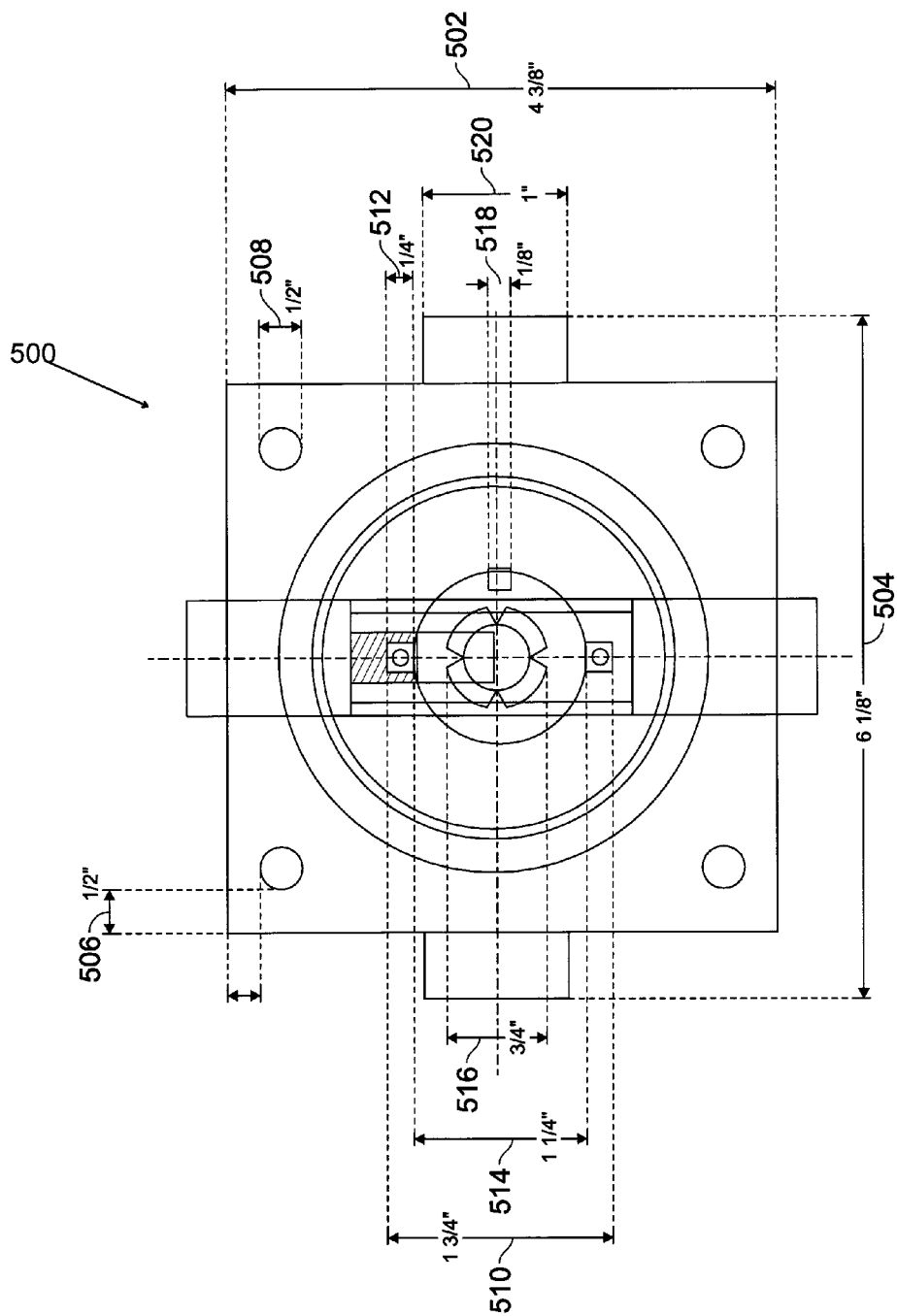
FIG. 5 is a diagram of top view cross section depicting overall outer dimensions in accordance with an example of the present invention.

Referring to FIG. 5 is a diagram depicting a set of measurements with respect to top dissection profile 500. According to a non limiting exemplary embodiment of the present invention the dimension for overall height of the spherical braking assembly 502 is 4 and ⅜ inches, the dimension for overall width of the spherical braking assembly 504 is 6 and ⅛ inches, the position of the connecting hole 506 is ½ inches, the diameter of the connecting hole 508 is ½ inches, the top surface distance 510 between two hydraulic cap screws is 1 and ¾ inches, the length of the hydraulic cap screw 512 is ¼ inches, the diameter of the brake hydraulic cap 514 is 1 and ¼ inches, the dimension for outer diameter of the hydraulic screw cap 516 is ¾ inches, the bleeder valve dimension 518 is ⅛ inches and the brake mount dimension 520 is 1 inch, as shown.

Figure 6:
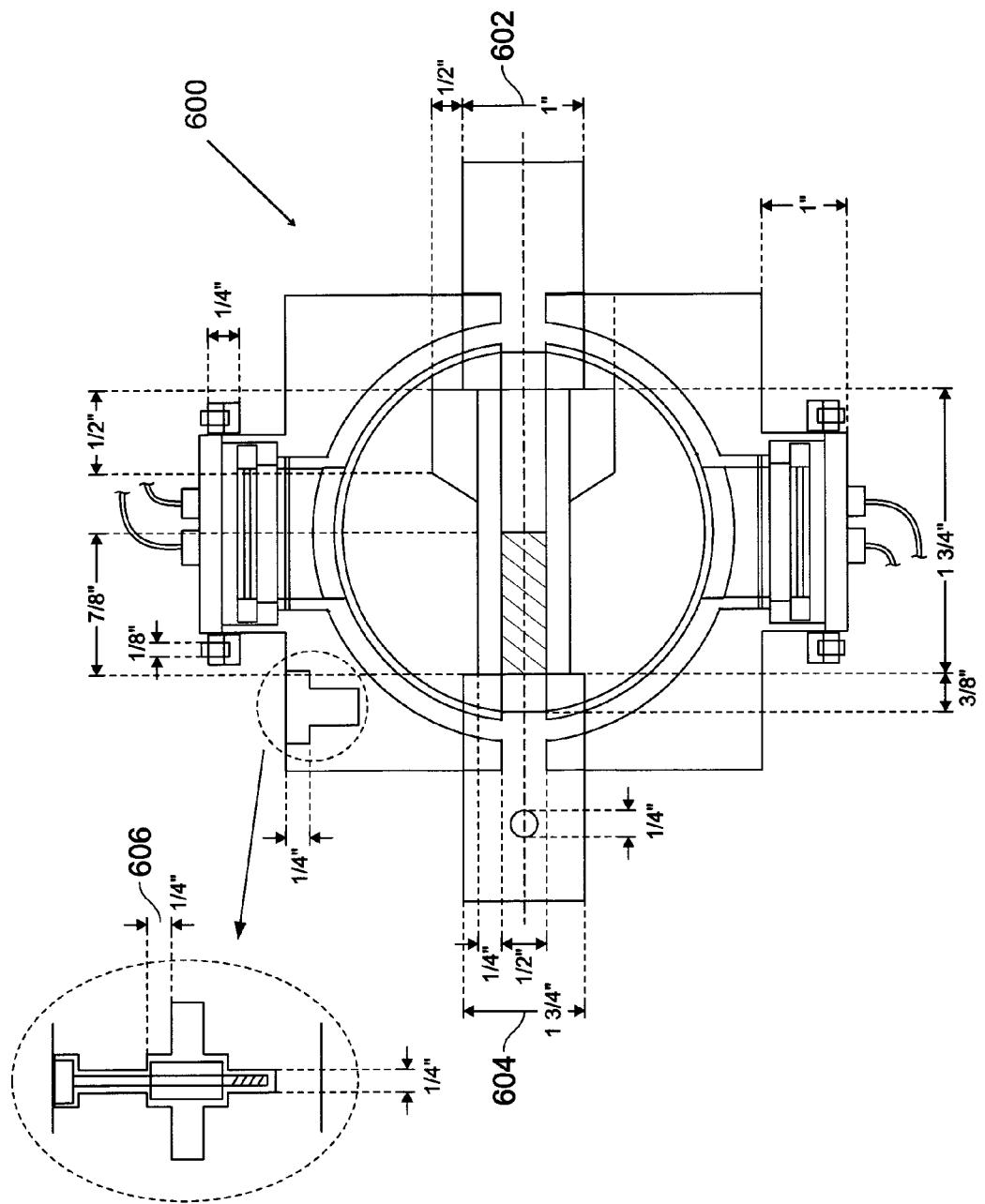
FIG. 6 is a diagram of side view cross section depicting a set of measurements in accordance with an example of the present invention.

Referring to FIG. 6 is a diagram depicting a set of measurements with respect to side dissection profile 600. According to a non limiting exemplary embodiment of the present invention the dimension for the drive shaft 602 is 1 inch, the dimension for the driven shaft 604 is 1 and ¾ inches and the mounting dog 606 dimensions are ¼ inches.

Figure 7:
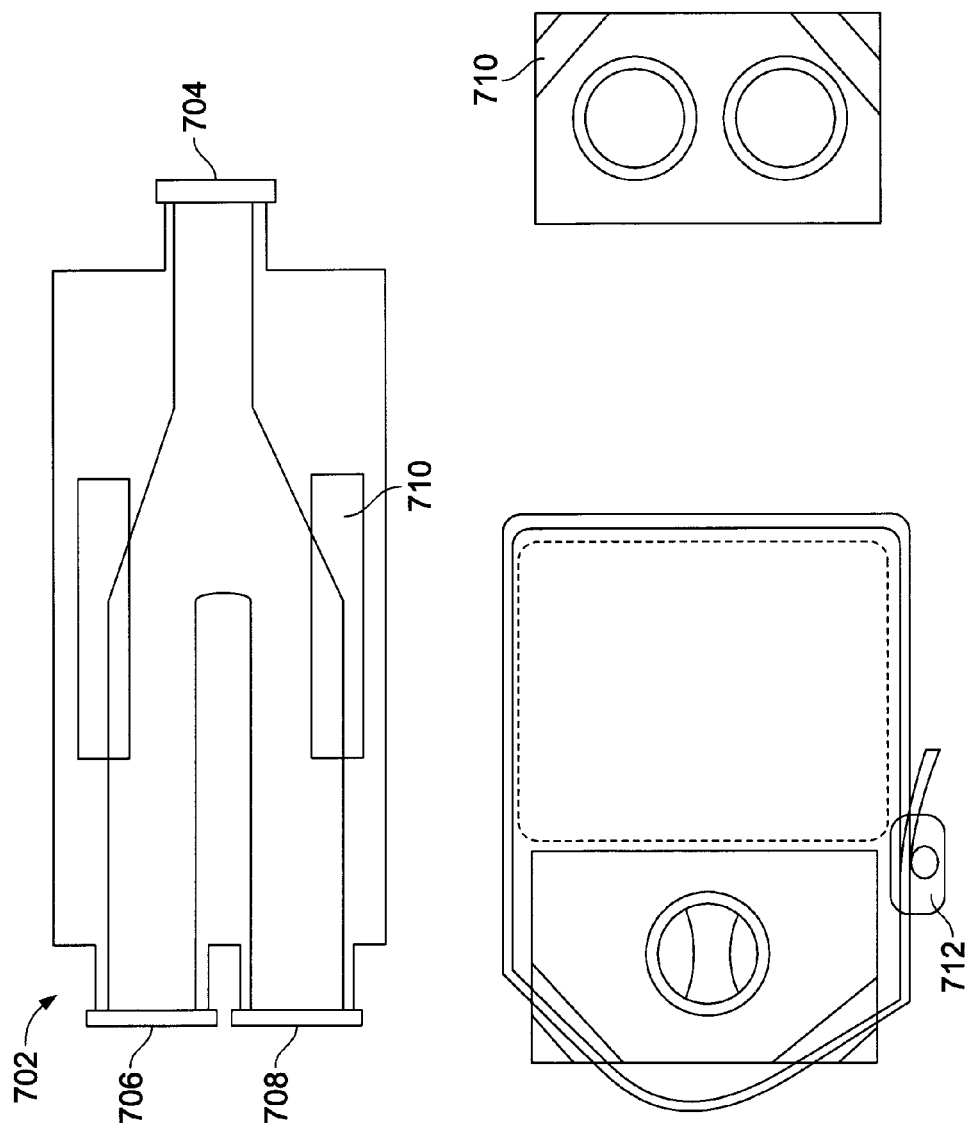
FIG. 7 is a diagram depicting the hydraulic line splitter connection to the braking system.

Referring to FIG. 7 is a diagram depicting the hydraulic line connection to the braking system. The in line hydraulic fluid splitter 702 is connected to hydraulic pump through channel 704. The hydraulic fluid pressure is distributed to upper brake housing through channel 706 and the lower brake housing channel 708. A universal screw clamp channel 710 is used to mount the hydraulic splitter. A male screw clamp is led through channels on the hydraulic line splitter 702 through the top to the bottom as the female end is let around the draft shaft and met up with the male end below the drive shaft, secured by a screw clamp 712.

Figure 8:
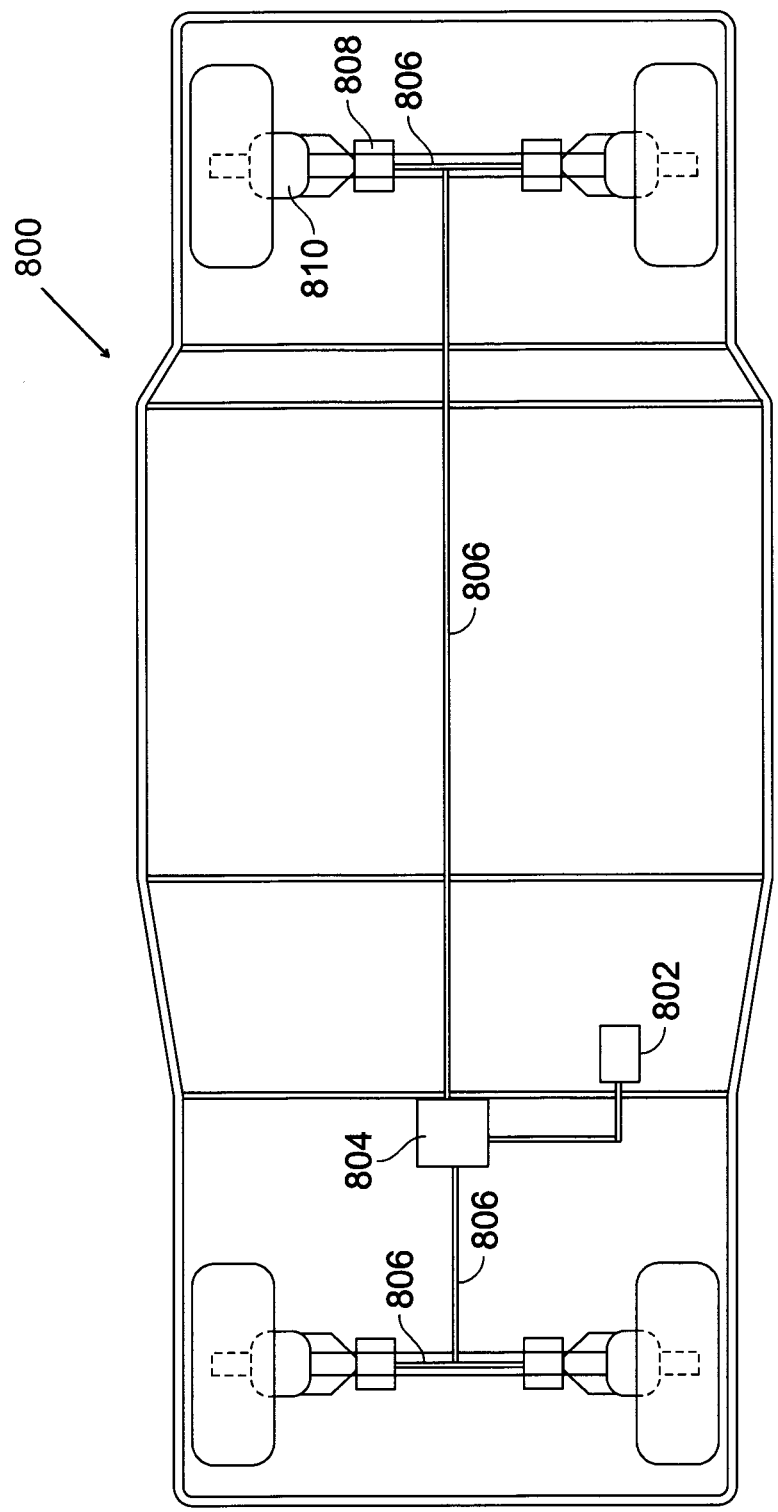
FIG. 8 is a diagram depicting a system of a vehicle having four braking systems in accordance with an example of the present invention.

Referring to FIG. 8 is a diagram depicting a system 800 of a vehicle having four braking systems. When the driver depresses the brake pedal 802, the resulting increase in hydraulic pressure causes the brake fluid chamber 804 to have an increase pressure. This increased pressure is transferred through the hydraulic lines 806 to the hydraulic splitter 808 located at one of each of the spherical braking systems 810 mounted near each wheel. The hydraulic splitter 808 splits the hydraulic fluid pressure path and transfers equally the fluid pressure to both the top and bottom brake housings in the braking systems 810. The spherical braking system is applicable to four wheel drive, all wheel drive and the two wheel drive systems of a vehicle, according to a non limiting exemplary embodiment of the present invention.

In an alternative embodiment, similar to FIG. 8, rather than four hydraulic splitters 808 being used for a single vehicle, two hydraulic splitters are used. In this alternative embodiment, one splitter is used for each drive shaft. Said splitters are located between the brake fluid chamber 804 and the spherical braking systems 810. Said splitters are each connected to the drive shaft allowing fluid to be delivered to the top and bottom brake housings of both spherical brake systems it regulates, rather than a single braking system as shown in FIG. 8.

While the description above refers to particular embodiments of the present invention, it will be understood by those skilled in the art that many modifications may be made and equivalents may be substituted without departing from the spirit thereof. The accompanying claims are intended to cover such modifications as would fall within the true scope and spirit of the present invention. The disclosed embodiments are therefore to be considered as illustrative and not as restrictive. The scope of the invention is defined by the appended claims.

I claim:

1. A vehicle braking system comprising:
   (a) a brake sphere engaged with a drive shaft adjacent to a wheel of a vehicle;
   (b) a top brake housing;
   (c) a bottom brake housing attached by screws with mounting dogs to said top brake housing to provide for proper spacing;
   (d) brake pads with an inner side and a contact side;
   (e) said top brake housing and bottom brake housing each having brake pads positioned with said inner side mounted to a hydraulic shaft and said contact side facing said brake sphere; and,
   (f) said hydraulic shaft connected to a vehicle's hydraulic lines.

2. The vehicle braking system of claim 1 whereby said hydraulic lines are connected to a hydraulic fluid splitter where said splitter evenly distributes hydraulic fluid pressure to said top brake housing and bottom brake housing.

3. The vehicle braking system of claim 2 further comprising a hydraulic brake pump tubularly attached to said hydraulic fluid splitter to maintain hydraulic fluid pressure within the hydraulic system.

4. The vehicle braking system of claim 3 whereby two braking systems are located adjacent to two wheels on a single drive shaft of a vehicle.

5. The vehicle braking system of claim 4 whereby said splitter evenly distributes fluid pressure to braking systems located at two wheels on a single drive shaft of a vehicle.

6. The vehicle braking system of claim 3 whereby four braking systems are located adjacent to four wheels on a vehicle.

7. The vehicle braking system of claim 6 whereby two splitters each evenly distribute hydraulic fluid pressure to a set of braking systems on opposite drive shafts.

8. The vehicle braking system of claim 6 whereby four splitters each evenly distribute hydraulic fluid pressure to each of said braking systems.

9. The vehicle braking system of claim 1 whereby said brake pads are formed with grooves on their contact side.

10. The vehicle braking system of claim 1 whereby said hydraulic shaft is formed with a threaded portion, a hydraulic cap and sealing means.

11. The vehicle braking system of claim 10 further comprising a bleeder valve.

12. An automobile comprising:
   a plurality of wheels; and
   the braking system of claim 1 for at least one of the plurality of wheels.

13. An automobile according to claim 12, whereby two braking systems are located adjacent to two of said plurality of wheels on a single drive shaft of the automobile.

14. An automobile according to claim 12, wherein said plurality of wheels comprises four wheels and four braking systems are located adjacent to said four wheels.

15. A vehicle braking system comprising:
   (a) a brake sphere permanently attached to a drive shaft driving at least one wheel of the vehicle;
   (b) first and second brake housings, each housing having a brake pad with an inner side and a contact side, said brake pad positioned with said inner side mounted to a hydraulic shaft and said contact side facing said brake sphere, for slowing the speed of said vehicle by applying pressure to said brake sphere to slow the rotation of the drive shaft, and
   (c) said hydraulic shaft connected to a vehicle's hydraulic lines.

16. A method for slowing down a vehicle comprising:
   (a) depressing a brake pedal;
   (b) increasing hydraulic fluid pressure in a hydraulic system;
   (c) forcing brake pads with an inner side and a contact side, each brake pad positioned with said inner side mounted to a hydraulic shaft and said contact side facing a brake sphere, to engage with said brake sphere, said hydraulic shaft connected to a vehicle's hydraulic system;
   (d) causing friction between said brake sphere and brake pads; and,
   (e) slowing the rotation of a drive shaft permanently attached to said brake sphere and driving at least one wheel of said vehicle.

* * * * *